A. JAS.
Condenser for Ice-Machine.
No. 168,501. Patented Oct. 5, 1875.
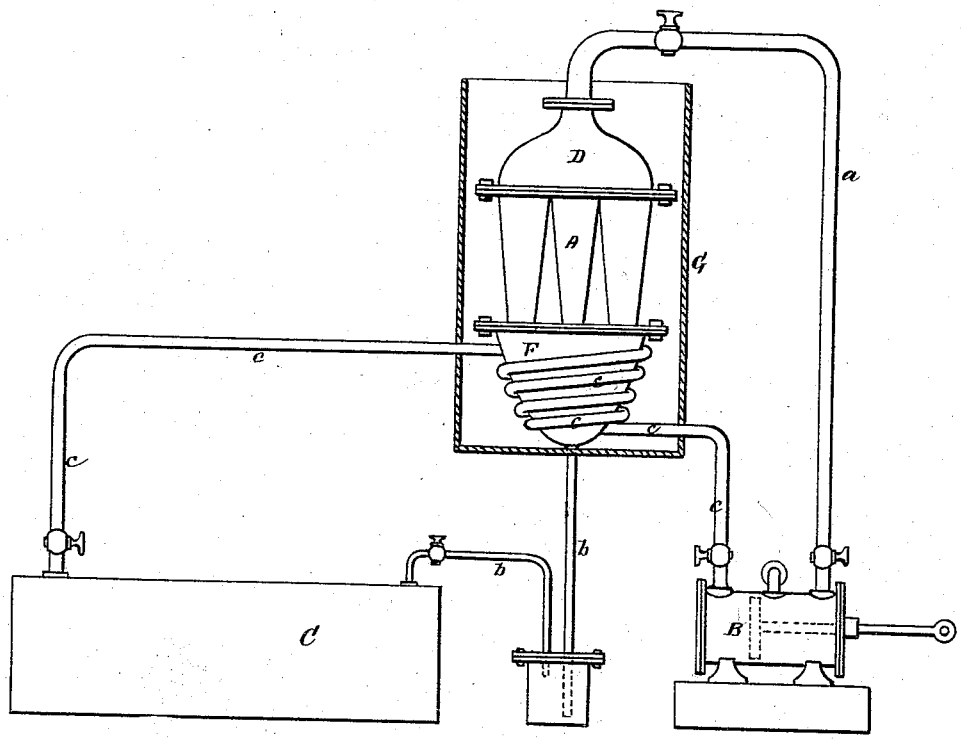
Witnesses:
Inventor:

UNITED STATES PATENT OFFICE.

AUGUSTE JAS, OF NEW ORLEANS, LOUISIANA.

IMPROVEMENT IN CONDENSERS FOR ICE-MACHINES.

Specification forming part of Letters Patent No. 168,501, dated October 5, 1875; application filed July 1, 1875.

*To all whom it may concern:*

Be it known that I, AUGUSTE JAS, of New Orleans, Louisiana, have invented certain new and useful Improvements in Condensers for Ice-Machines, of which the following is a specification:

This invention is an improvement on that for which I have obtained Letters Patent No. 161,237, dated March 23, 1875.

My improvement consists in leading the return pipe that conducts the refrigerant from the freezing-vessel to the pump through the water tank or vessel in which the condenser is located, and coiling said pipe around the lower portion or liquid-receptacle of said condenser. In this way I obtain a more speedy and complete condensation of the vapor or gas, while, at the same time, the apparatus is simplified and rendered less cumbersome, this latter effect being due to the fact that I am enabled to use the water-tank surrounding the condenser as a receptacle for the limpid water to be supplied to the molds of the freezing-vessel, instead of using for this purpose, as heretofore, a separate vessel, in which the water is preliminarily cooled.

The accompanying drawing is a diagram of so much of an ice-machine as is needed to illustrate my invention.

A are the condensing-tubes. D is the upper or vapor-receiving chamber. F is the lower or liquid-receptacle. G is the surrounding water-tank. These parts are combined and arranged for operation substantially as described in my aforesaid Letters Patent. The conduit leading from the pump B to the condenser is marked *a*. The conduit leading from the condenser to the freezing-vessel C is marked *b*. These parts are organized and operate together as contemplated in my aforesaid Letters Patent. The return pipe that conveys the refrigerant from the freezing-vessel C to the pump B is marked *c*. It is in the combination of this pipe with the condensing apparatus that my present invention is found.

As shown in the drawing, the return pipe passes through the water-tank G, and is coiled around the liquid-receptacle of the condenser.

This arrangement manifestly will have the effect of hastening and rendering more complete the condensation of the gas. It also is productive of a further advantage, which I shall proceed to set forth. The water supplied to the tank G is of a quality to be used in the freezing-molds. That water which fills the lower part of the tank and surrounds the liquid-receptacle and the coil is cooled by the action of the gas passing through the coil, and by reason of its superior weight, which results from this cooling action, remains at the bottom of the tank, divided from the entering water, which, it may be stated, enters the tank at a point sufficiently high to cause the inflowing current to be directed upon the lower plate that supports the lower ends of the condensing-tubes, whence it passes upward to the overflow. Thus I maintain in the lower part of the tank a body of water which is very cold, and in that condition can be drawn off through a cock in the bottom of the tank, and supplied to the molds. The water thus drawn off will be immediately replaced by water from above, which, however, will have no appreciable effect upon the cold body of water that lies directly above the bottom of the tank.

What I now claim, and desire to secure by Letters Patent, is—

The described improvement on my aforesaid patented apparatus, which consists in the combination, with the condenser and the water-tank, of the return-pipe, which passes through the tank and is coiled around the lower or liquid receptacle of the condenser, substantially as set forth.

AUGUSTE JAS.

Witnesses:
 JOSEPH COHN,
 CHAS. F. BARRY.